US007223491B2

(12) United States Patent
McLean et al.

(10) Patent No.: US 7,223,491 B2
(45) Date of Patent: May 29, 2007

(54) FUEL CELLS INCORPORATING MEMBRANES

(75) Inventors: Gerard Francis McLean, West Vancouver (CA); Tran Ngo, Burnaby (CA); Ned Djilali, Victoria (CA); Anna Stukas, Victoria (CA); Jeremy Schrooten, Mission (CA)

(73) Assignee: Angstrom Power Incorporated, North Vancouver, BC ( * ) Notice: Subject to any disclaimer, the term of this patent is extended or adjusted under 35 U.S.C. 154(b) by 0 days.

(21) Appl. No.: 11/290,647

(22) Filed: Dec. 1, 2005

(65) Prior Publication Data

US 2006/0083973 A1 Apr. 20, 2006

Related U.S. Application Data

(62) Division of application No. 11/047,558, filed on Feb. 2, 2005.

(60) Provisional application No. 60/567,437, filed on May 4, 2004.

(51) Int. Cl.
*H01M 8/10* (2006.01)
(52) U.S. Cl. .......................................... 429/30; 429/32
(58) Field of Classification Search .................. 429/30, 429/34, 38, 129, 132, 142, 144, 145
See application file for complete search history.

(56) References Cited

U.S. PATENT DOCUMENTS 5,160,627 A   11/1992  Cussler et al.
5,853,916 A * 12/1998  Venugopal et al. .......... 429/303
6,579,643 B1 * 6/2003   Gozdz ........................ 429/145
6,582,847 B1   6/2003   Bruck et al.
6,613,203 B1   9/2003   Hobson et al.
6,815,121 B2 * 11/2004  Dasgupta et al. ........... 429/212
2003/0124401 A1 * 7/2003  Issacci et al. ................ 429/26
2003/0194598 A1  10/2003  Chan
2004/0175626 A1 * 9/2004  Dasgupta et al. ........... 429/309

FOREIGN PATENT DOCUMENTS

CA   2473491 A1   8/2003
CA   2479000 A1   9/2003
EP    763 070 B1   3/1997

OTHER PUBLICATIONS

International Search Report for PCT/CA2005/000663, International Searching Authority, Aug. 30, 2005, pp. 1-3.

* cited by examiner

*Primary Examiner*—Patrick Joseph Ryan
*Assistant Examiner*—Monique Wills
(74) *Attorney, Agent, or Firm*—Oyen Wiggs; Green & Mutala LLP

(57) ABSTRACT

A fuel cell has an ion-conducting membrane comprising an ion-conducting region and a non-ion-conducting region. The ion-conducting region is formed by a plurality of ion-conducting passageways that extend through the membrane. The passageways are filled with ion-conducting material and may be surrounded by non-ion conducting material. The membrane may comprise a substrate of non-ion-conducting material that is penetrated by openings, each opening providing a corresponding one of the passageways.

20 Claims, 10 Drawing Sheets

FUEL CELLS INCORPORATING MEMBRANES

RELATED APPLICATIONS

This is a divisional of U.S. patent application Ser. No. 11/047,558 filed on 2 Feb. 2005. The subject matter of this application is related to that of co-owned U.S. application Ser. No. 11/047,560 filed on 2 Feb. 2005 entitled "ELECTROCHEMICAL CELLS HAVING CURRENT CARRYING STRUCTURES UNDERLYING ELECTROCHEMICAL REACTION LAYERS" and co-owned U.S. application Ser. No. 11/047,557 filed on 2 Feb. 2005 entitled "ELECTROCHEMICAL CELLS FORMED ON PLEATED SUBSTRATES", both of which are hereby incorporated by reference herein. This application claims the benefit of U.S. Application No. 60/567,437 filed on 4 May 2004 which is hereby incorporated by reference herein.

FIELD OF THE INVENTION

This invention relates to electrochemical cells, such as fuel cells, electrolysis cells and the like which incorporate ion-conducting membranes. Particular embodiments of the invention provide ion-conducting membranes for use in such cells.

BACKGROUND

Ion-conducting membranes, including ionomeric membranes such as Nafion™, are an important component in membrane separation processes and electrochemical reactor systems including chlor-alkali cells, electrolysis cells and fuel cells. Such membranes act as ion conductors while preventing reactants from inter-mixing. In some applications, the ions conducted by such membranes are protons. The availability of materials which are solid and can conduct protons has allowed a breakthrough in the production of simple and robust fuel cell devices.

In typical prior art fuel cells, the ion-conducting membrane is an ionomeric membrane that fulfills several functions including providing ion conductivity, providing a barrier between reactants and providing a structural spacer that withstands the clamping forces necessary to seal the fuel cell.

The design of ion-conducting membranes for use in electrochemical cells typically requires balancing between two competing design objectives. Firstly, it is generally desirable to maximize the conductivity of the ion-conducting membrane to minimize operational losses. This first objective tends to favor ion-conducting materials which have high water contents and therefore approach liquid form. Secondly, it is generally desirable to provide a membrane that is robust and usable as a structural material within the cell to maintain integrity of the cell in the presence of differential pressures across the membrane. This second objective tends to favor ion-conducting materials which are solid and have high strength. It will be appreciated that these two design objectives often conflict with one another. Current practices for designing electrochemical cells involve making compromises between these design objectives.

An example of an ion-conducting material is Nafion™, which is typically provided in the form of sheets that may be as thin as 25 microns. FIG. 1 is a schematic cross-sectional view of a Nafion™ membrane 8. Membrane 8 is a continuous sheet of ion-conducting material. Nafion™ membranes are susceptible to mechanical failure and are difficult to work with, especially if they are very thin. Another problem with materials like Nafion™ is that they are not dimensionally stable when used to conduct protons. Variations in water content of the membrane, which are inevitable during proton conduction, cause considerable shrinking and swelling. Electrochemical cells incorporating Nafion™ membranes must be designed to accommodate such shrinking and swelling.

Gore-Select™ is a composite perfluorinated material consisting of a homogeneously porous substrate filled with an ion-conducting material. U.S. Pat. No. 6,613,203 describes a membrane of this type. FIG. 2 schematically depicts a Gore-Select™ membrane 10 having a homogeneous substrate 12 filled with an ion-conducting material 14. Porous substrate 12 provides membrane 10 with some degree of structural integrity and dimensional stability, while ion-conducting filler 14 provides proton conductivity.

There remains a need for ion-conducting membranes for use in electrochemical applications, such as fuel cells, electrolysis cells, chlor-alkali plants and the like, which possess advantageous mechanical properties and desirably high ion conductivity.

SUMMARY OF THE INVENTION

A first aspect of the invention provides an ion-conducting membrane comprising an ion-conducting region. The ion-conducting region comprises a substrate having one or more ion-conducting passageways that extend through the substrate. Each passageway comprises an ion-conducting material that is relatively more ion conductive than the substrate.

Another aspect of the invention provides an ion-conducting membrane which comprises: a substrate penetrated by a plurality of openings in a porous region thereof; and an ion-conducting material which fills the openings to provide a plurality of ion-conducting passageways through the substrate. The ion-conducting material is relatively more ion conductive than the substrate.

Another aspect of the invention provides an ion-conducting membrane, which comprises: a substrate penetrated by at least one opening; and an ion-conducting material which fills the at least one opening to provide an ion-conducting passageway through the substrate and which provides a first skin layer on a first side of the substrate, the skin layer extending transversely past a perimeter of the opening. The ion-conducting material is relatively more ion-conductive than the substrate.

Another aspect of the invention provides an ion-conducting membrane comprising an ion-conducting region. The ion-conducting region comprises a substrate having one or more ion-conducting passageways that extend through the substrate. The ion-conducting passageways are formed by selectively converting the substrate to a relatively more ion conductive state in locations corresponding to the ion-conducting passageways.

Another aspect of the invention provides an electrochemical cell comprising an ion-conducting membrane in accordance with the invention.

Another aspect of the invention provides a method for fabricating an ion-conducting membrane for use in an electrochemical cell. The method comprises: forming a plurality of openings which penetrate a sheet of substrate material at selected locations to create a porous region; and, filling the openings with an ion-conducting material to create a plurality of ion-conducting passageways through the substrate material.

Another aspect of the invention provides a method for fabricating an ion-conducting membrane for use in an electrochemical cell. The method comprises selectively converting a sheet of substrate material to a relatively more ion conductive state in a plurality of locations to create a plurality of ion-conducting passageways through the sheet and to create an ion-conducting region in the sheet.

Another aspect of the invention provides a method for fabricating an ion-conducting membrane for use in an electrochemical cell. The method comprises: forming at least one opening which penetrates a sheet of substrate material; and, filling the at least one opening with an ion-conducting material to create an ion-conducting passageway through the substrate material; and forming a first skin layer on a first side of the substrate, the skin layer extending transversely past a perimeter of the opening.

Further features and applications of specific embodiments of the invention are described below.

BRIEF DESCRIPTION OF THE DRAWINGS

In drawings which illustrate non-limiting embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Membranes suitable for use in electrochemical cells may be fabricated by providing a sheet of substrate material and forming one or more ion-conducting passageways through the sheet of substrate material. The ion-conducting passageway(s) have an ion conductivity greater than that of the surrounding substrate material. Ion-conducting passageway(s) may be formed by creating opening(s) which penetrate the substrate material and then filling the opening(s) with ion-conducting material and/or by selectively converting the substrate material to a relatively more ion conductive state in location(s) of the ion-conducting passageway(s). Mechanical and ion-conducting properties of the membranes can be made different in different regions by providing the ion-conducting passageway(s) with varying sizes, shapes, densities and/or arrangements.

Figure 1:
FIG. 1 is a cross-sectional schematic view of a sheet of ion-conducting material of the type commonly employed in prior art fuel cells.
Figure 2:
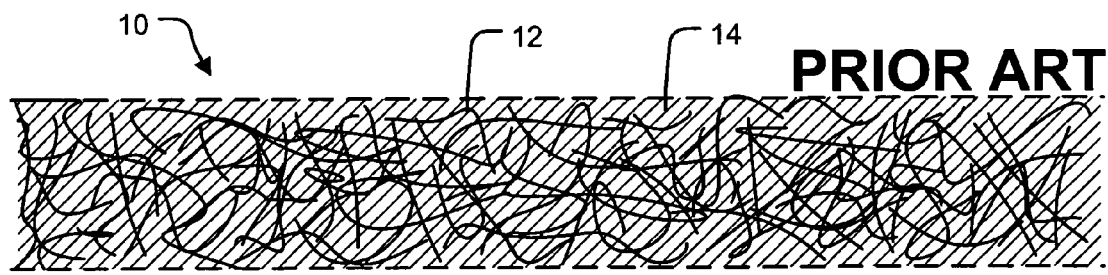
FIG. 2 is a cross-sectional schematic view of a prior art composite membrane having a homogeneously porous substrate filled with ion-conducting material.
Figure 3A:
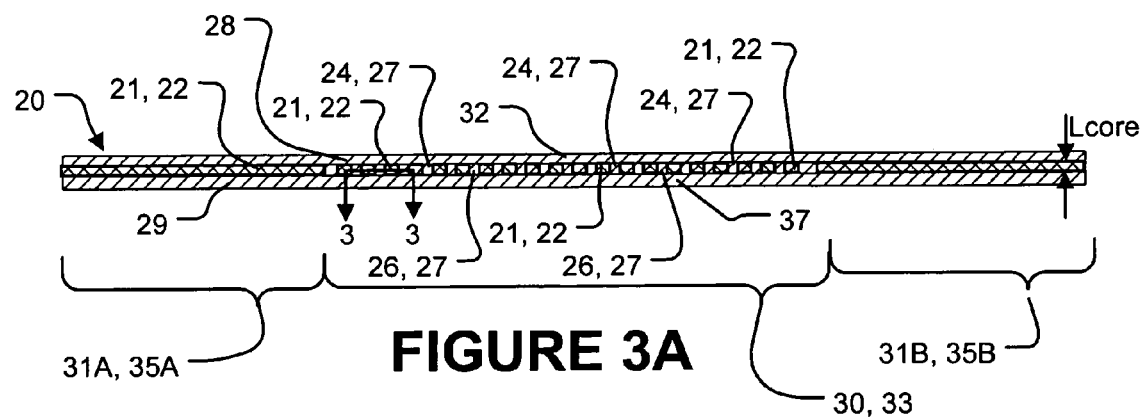
FIG. 3A is a cross-sectional schematic view of an ion-conducting membrane according to a particular embodiment of the invention.

FIG. 3A is a schematic cross-sectional depiction of an ion-conducting membrane 20 according to a particular embodiment of the invention. Membrane 20 comprises one or more ion-conducting regions 33 and one or more non-ion-conducting regions 35A, 35B (collectively 35). FIG. 3A shows a membrane 20 having one ion-conducting region 33 bordered by a pair of non-ion-conducting regions 35A, 35B. Membrane 20 comprises a substrate 21 of substrate material 22 and optionally comprises first and/or second skins 28, 29 on respective sides 32, 37 of substrate 21.

Ion-conducting region 33 of membrane 20 comprises ion-conducting passageways 27 that extend from a first side 32 of substrate 21 to a second side 37 of substrate 21. Ion-conducting passageways 27 comprise an ion-conducting material 26 having an ion conductivity greater than that of the surrounding material (i.e. the material outside of ion-conducting passageways 27). In some embodiments, ion-conducting material 26 is an ionomeric material. Optional skins 28, 29 may also comprise ion-conducting material 26.

Ion-conducting passageway(s) 27 may be formed by creating opening(s) 24 which penetrate a substrate material 22 and then filling the opening(s) 24 with ion-conducting material 26 and/or by selectively converting substrate material 22 to a relatively more ion conductive state in location(s) of ion-conducting passageway(s). Both of these fabrication techniques are discussed in more detail below.

In accordance with one embodiment of the invention, membrane 20 comprises a substrate 21 made of a substrate material 22. Openings 24 are formed to penetrate substrate 21 at selected locations. Openings 24 may be micro-structures. In this disclosure, a "micro-structure" is a structure capable of being revealed by a microscope having a magnification of 5 times or more. Openings 24 need not be micro-structures. In some embodiments, openings 24 are larger.

Openings 24 provide substrate 21 with one or more porous regions 30 which are relatively more porous than surrounding regions 31A, 31B. Each porous region 30 of substrate 21 comprises a plurality of openings 24 and corresponds with an ion-conducting region 33 of membrane 20. Non-porous regions 31A, 31B (collectively, 31) respectively correspond to non-ion-conducting regions 35A, 35B of membrane 20. In the FIG. 3A embodiment, there are no openings 24 formed in non-porous regions 31A, 31B of substrate 21.

Substrate material 22 may comprise any suitable material or combination of materials that provides a substantial barrier to the reactants with which membrane 20 will be used. For example, a membrane for use in a hydrogen/air fuel cell is preferably substantially impermeable to hydrogen and oxygen gases. Substrate material 22 may comprise, for example, a material selected from:
polyamide films,
polyimide films, such as Kapton™,
polyethylene films,
Teflon™ films,
films comprising other polymers,
a resin precursor to hydrolyzed Nafion™,
non-polymer materials such as silicon or glass.

Substrate material 22 is selected to be suitable for the desired application. In some embodiments, it is advantageous for substrate material 22 to be flexible to some degree.

In porous region(s) 30 of substrate 21, openings 24 are filled with an ion-conducting material 26 to form ion-conducting passageways 27 that extend through membrane 20 from a first side 32 of substrate 21 to a second side 37 of substrate 21. Ion-conducting material 26 is relatively more ion-conductive than the surrounding substrate material 22. In the illustrated embodiment, passageways 27 each have a path length equal to the thickness $L_{core}$ of substrate 21. In other words, passageways 27 have tortuosity factors of 1, where tortuosity is equal to the distance that a particle must travel to pass through substrate 21 divided the thickness ($L_{core}$) of substrate 21.

Openings 24 may be formed in substrate 21 using any suitable method. By way of non-limiting example, openings 24 may be formed through substrate 21 by:
chemical etching;
laser micromachining;
laser drilling;
mechanical drilling;
milling;
punching;
calendaring;
printed circuit board fabrication techniques;
lithographic fabrication techniques;
mechanical dies; and
the like.

As noted above, passageways may also be formed without forming and filling openings 24 by selectively converting the material of substrate 21 from one state to another, for example by selectively hydrolyzing a Nafion™ precursor resin.

The dimensions of passageways 27, the spacing between passageways 27, the shapes of passageways 27 and the arrangement of passageways 27 can be selected to suit particular applications and may be influenced by cost factors. In one particular example, passageways 27 are formed in the shape of slits in openings 24 made using conventional sheet conversion methods. Passageways 27 may be round or may have other shapes, such as cross shapes, hexagonal shapes, oval-shapes, elliptical shapes or star shapes.

In preferred embodiments, passageways 27 are formed in ordered arrangements, as opposed to placed at random locations. Any suitable patterns may be used. For example, passageways 27 may be located at nodes of:
a square or rectangular array;
a triangular array;
a hexagonal array; or,
any other suitable arrangement.

Figure 3B:
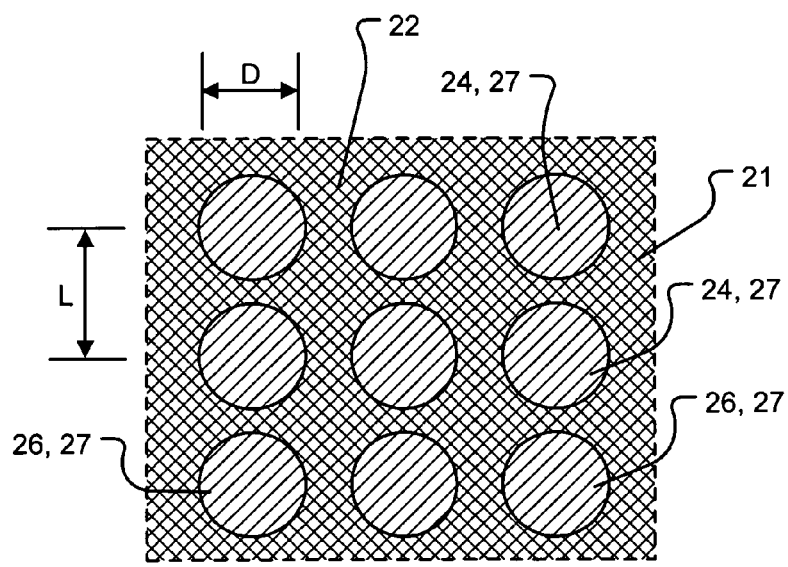
FIG. 3B is a partial transverse cross-sectional view of the ion-conducting region of the FIG. 3A membrane taken along the line 3—3 (see FIG. 3A) in accordance with a particular embodiment of the invention.

FIG. 3B is a partial cross-sectional view of ion-conducting region 33 of membrane 20 along the line 3—3 (see FIG. 3A) in accordance with a particular embodiment of the invention. In this embodiment, ion-conducting passageways 27 are circular in transverse cross-section and are arranged in a rectangular array.

The parameter D is used to denote the widest transverse dimension of ion-conducting passageways 27. In the FIG. 3B embodiment, passageways 27 are all the same size and the parameter D is equal to the diameter of the openings 24 in which passageways 27 are formed. The parameter L denotes the center-to-center transverse spacing of the nearest adjacent ion-conducting passageways 27.

Figure 3C:
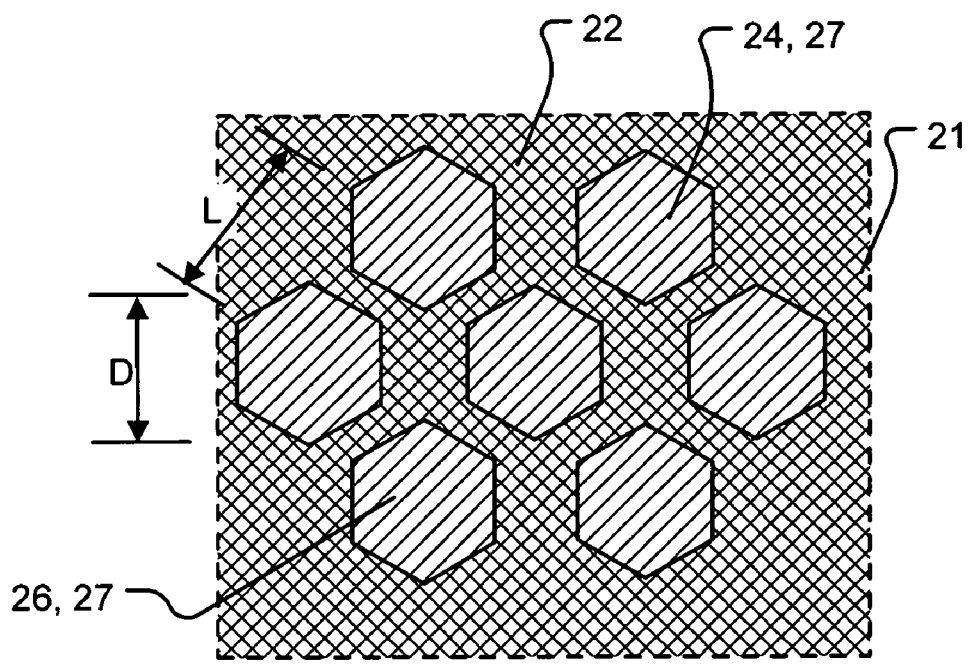
FIG. 3C is a partial transverse cross-sectional view of the ion-conducting region of the FIG. 3A membrane taken along the line 3—3 (see FIG. 3A) in accordance with another embodiment of the invention.

FIG. 3C depicts a partial cross-sectional view of ion-conducting region 33 of membrane 20 along the line 3—3 (see FIG. 3A) according to another embodiment of the invention. In the FIG. 3C embodiment, ion-conducting passageways 27 are hexagonal in transverse cross-section and are arranged in a hexagonal packing array. The parameters D (i.e. the widest dimension of passageways 27) and L (i.e. the center-to-center spacing between nearest adjacent passageways 27) are also illustrated in FIG. 3C.

In some embodiments, the parameter D of passageways 27 is 200 microns or less. In other embodiments, the parameter D of passageways 27 is 2500 microns or less. In some embodiments, passageways 27 have cross-sectional areas not exceeding $5\times10^{-8}$ m$^2$. In other embodiments, passageways 27 have cross-sectional areas not exceeding $1\times10^{-5}$ m$^2$. In some embodiments, ion-conducting passageways 27 have a minimum transverse dimension of at least 25 microns. In other embodiments, ion-conducting passageways 27 have a minimum transverse dimension of at least 50 microns. In some embodiments, the parameter L of passageways 27 is 500 microns or less in at least some areas of porous region 30. In other embodiments, the parameter L of passageways 27 is 5000 microns or less in at least some areas of porous region 30.

For maximum conductivity through membrane 20, it is desirable for the parameter ratio L/D to be as close to unity as possible. In some embodiments, membranes according to the invention are constructed having a parameter ratio L/D not exceeding 2.5 in one or more ion-conducting regions. In other embodiments, membranes according to the invention are constructed having a parameter ratio L/D not exceeding 1.5.

Another ratio parameter γ may be used to characterize conducting regions of membranes according to the invention. The ratio parameter γ may be defined as the ratio of the total transverse area of an ion-conducting region to the total transverse area of the ion-conducting passageways 27 within the ion-conducting region. In some embodiments, membranes according to the invention are constructed having a parameter ratio γ not exceeding 2.5 in one or more ion-conducting regions. In other embodiments, membranes according to the invention are constructed having a parameter ratio γ not exceeding 1.5.

Substrate 21 provides structural support for ion-conducting material 26 and overall structural support for membrane 20 (see FIG. 3A). The mechanical properties of substrate 21 can be selected to match the mechanical properties desired for particular applications. For example, by varying the density, size, shape and/or arrangement of openings 24 in different regions of substrate 21, one can provide different mechanical properties and/or different ion-conducting properties in those different regions.

Figure 4:
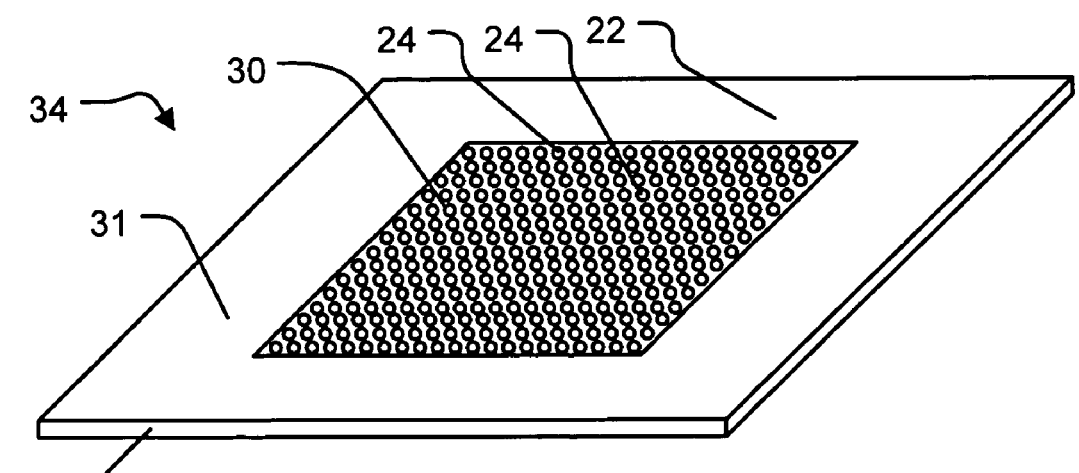
FIG. 4 is a perspective view of a sheet of substrate material which may be used in a membrane of the type shown in FIG. 3A according to a particular embodiment of the invention.

FIG. 4 shows a planar sheet 34 of substrate material 22 according to a particular embodiment of the invention. Sheet 34 may be used as a substrate 21 of an ion-conducting membrane 20 of the type shown in FIG. 3A for use in an electrochemical cell, such as a fuel cell. In the FIG. 4 embodiment, sheet 34 is fabricated from a thin sheet of substrate material 22 and is divided into perimeter (non-porous) seal region 31, which surrounds porous region 30. Porous region 30 has openings 24 which penetrate sheet 34. When a fuel cell having an ion-conducting membrane 20 is constructed using sheet 34 as a substrate 21, ions may be conducted through openings 24 of porous region 30, while perimeter seal region 31 provides structural strength in the vicinity of the fuel cell's compressive seals.

It is not necessary that porous region 30 be uniformly porous. In some cases, it is advantageous to vary characteristics of openings 24 (e.g. size, shape, density and/or arrangement of openings 24) and/or the parameters associated with openings 24 (e.g. L, D, L/D and/or $\gamma$) across a porous region, such as region 30. In some cases, it is advantageous to provide a substrate 21 with a plurality of porous regions. The characteristics of openings 24 and parameters associated with openings 24 may be different in each such porous region.

In regions expected to be subjected to relatively high local mechanical stresses, openings 24 may be made relatively small and/or the density of openings 24 may be made relatively low. In regions expected to be subjected to relatively high local mechanical stresses, the parameter ratio L/D and/or the parameter $\gamma$ may be made relatively large. For example, in such regions, the parameter ratio L/D and/or the parameter $\gamma$ may be greater than 5. Although such regions may have relatively low proton conductivity, they may provide relatively high mechanical strength.

In regions expected to be subjected to relatively low mechanical stresses, openings 24 may be made relatively large and/or the density of openings 24 may be made relatively high. In regions expected to be subjected to relatively low mechanical stresses, the parameter ratio L/D and/or the parameter $\gamma$ may be made relatively low. For example, in such regions, the parameter ratio L/D and/or the parameter $\gamma$ may be less than 3. Such regions may provide relatively high proton conductivity at the expense of electro-mechanical strength. Using these techniques, it is possible tune the performance (i.e. mechanical strength and proton conductivity) over the spatial dimensions of a fuel cell membrane.

Figure 5:
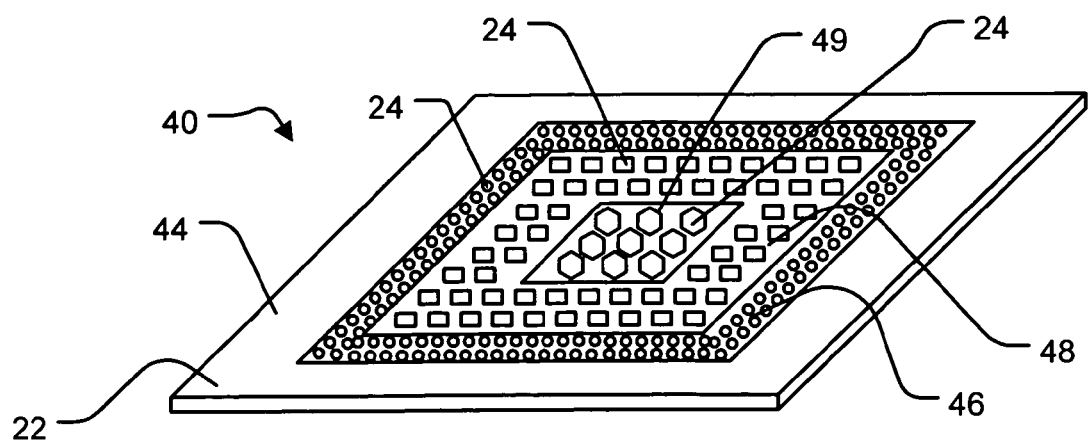
FIG. 5 is a perspective view of a sheet of substrate material which may be used in a membrane of the type shown in FIG. 3A according to another embodiment of the invention.

FIG. 5 shows a planar sheet 40 of substrate material 22 according to another example embodiment of the invention. Sheet 40 may be used as a substrate 21 of an ion-conducting membrane 20 of the type shown in FIG. 3A for use in a fuel cell. Sheet 40 is formed from a substrate material 22 and comprises: a non-porous perimeter region 44, a first porous region 46, a second porous region 48, and a third porous region 49. Porous regions 46, 48, and 49 each have openings 24. The characteristics of openings 24 and/or the parameters associated with openings 24 in porous regions 46, 48, 49 differ from one another. For example, the size of their openings 24, the density of openings 24, the shape of openings 24 and/or the arrangement or openings 24 vary between porous regions 46, 48, 49. In the FIG. 5 embodiment, the size and shape of openings 24 varies between porous regions 46, 48, 49.

In other embodiments (not shown), the characteristics of openings 24 (e.g. density, size, shape and/or arrangement) and/or the parameters of openings 24 (e.g. L, D, L/D and/or $\gamma$) vary smoothly over a porous region of a substrate. For example, the parameter ratio L/D and/or the parameter $\gamma$ of openings 25 may vary in accordance with a smooth function such as a bell curve. In still other embodiments (not shown), a sheet of substrate material 22 may be fabricated to have openings 24 of uniform characteristics and/or parameters over the entire sheet of substrate material 22. Openings 24 are described herein as having various characteristics, such as size, shape, density, arrangement and various parameters, such as L, D, minimum transverse dimension, L/D and $\gamma$. Any of these characteristics and/or parameters may also be used to describe ion-conducting passageways generally.

Each of the embodiments described above comprises a single sheet of substrate material through which ion-conducting passageways 27 are formed to provide one or more ion-conducting regions. In some embodiments of the invention, ion-conducting membranes comprise composite substrates made of multiple layers of different materials. Some layers of a composite substrate may be porous. For example, one or more layers of a composite substrate may comprise a mesh material. Other layers of such a composite substrate may comprise ion-conducting regions and ion-non-conducting regions according to a suitable one of the constructions described herein. A composite substrate fabricated in this manner may have superior mechanical strength.

Figure 6:
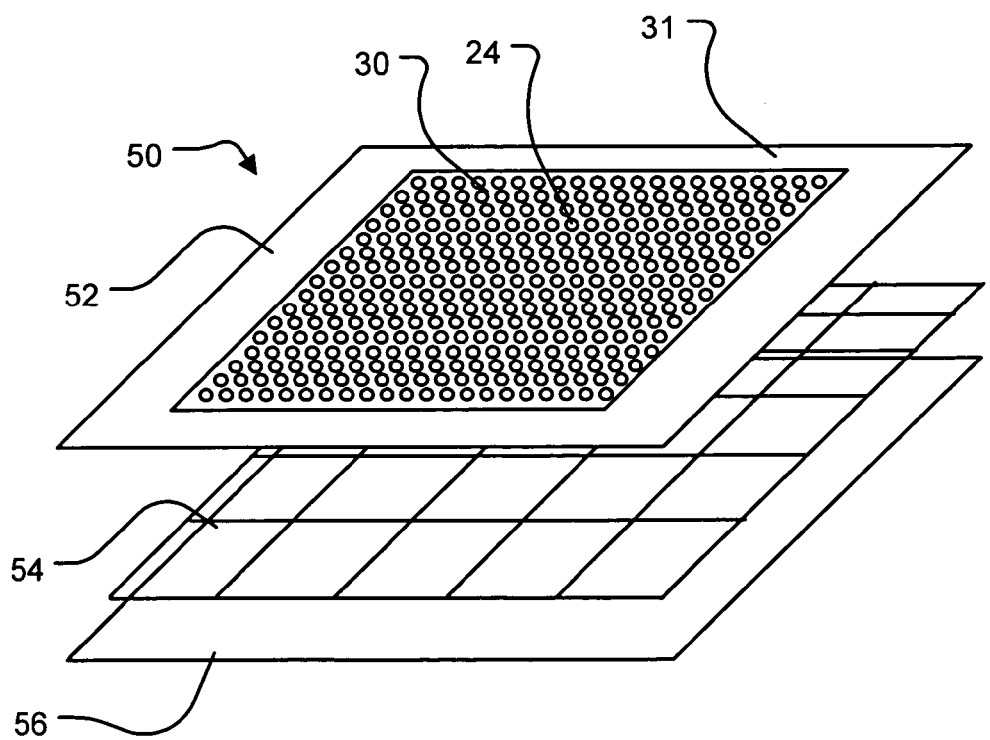
FIG. 6 is an exploded perspective view of a substrate made from a lamination of multiple sheets of precursor materials which may be used in a membrane of the type shown in FIG. 3A according to another embodiment of the invention.

FIG. 6 is an exploded view of a composite substrate 50 in accordance with a particular embodiment of the invention. Composite substrate 50 comprises a first layer 52. Layer 52 may comprise a substrate layer similar to any of those described above, for example. In the illustrated embodiment, layer 52 comprises a non-porous region 31 which surrounds a porous region 30 having openings 24 formed therein. Intermediate layer 54 comprises a mesh-like structure bonded to first layer 52 to provide structural reinforcement. Optional backing layer 56 may form a lamination, so that intermediate layer 54 is encapsulated between layers 52 and 56. A composite substrate may have more than 2 or 3 layers of substrate precursor materials.

The foregoing discussion has dealt primarily with the nature and formation of substrates comprising porous regions formed in substrate material. Ion-conducting materials, such as ionomers, can be deposited into porous regions of such substrates to form ion-conducting membranes having ion-conducting passageways for use in fuel cells, electrolysis cells and the like. Ion-conducting materials may be deposited in various arrangements on such substrates to make ion-conducting membranes according to the invention.

Figure 7A:
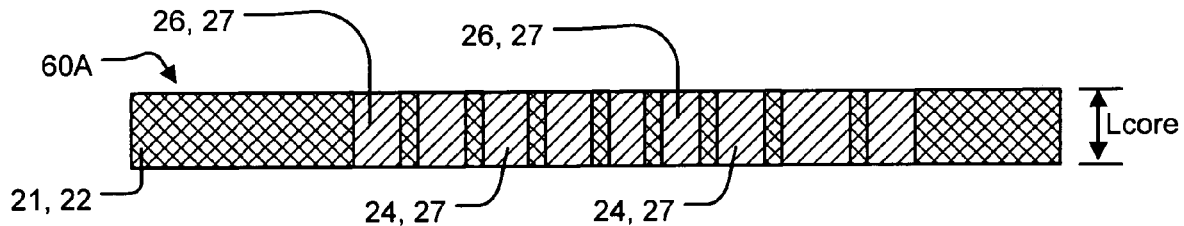
FIGS. 7A–7D are cross-sectional schematic views of ion-conducting membranes according to various embodiments of the invention.

FIGS. 7A, 7B, 7C and 7D show cross-sections of a number of exemplary ion-conducting membranes according to various embodiments of the invention. Ion-conducting material is arranged differently in each of the membranes depicted in FIGS. 7A, 7B, 7C and 7D. FIG. 7A shows a membrane 60A comprising a substrate 21 formed from a substrate material 22. Substrate 21 has openings 24 formed therein. Openings 24 of membrane 60A are filled with ion-conducting material 26 to form ion-conducting passageways 27 through membrane 60A. Ion-conducting material 26 is relatively more ion-conductive than substrate material 22. In membrane 60A, the thickness of the ion-conducting material 26 and the length of ion-conducting passageways 27 are substantially similar to the thickness $L_{core}$ of substrate 21. In other embodiments, the thickness of ion-conducting material 26 (and the ion-conducting passageways 27) differ from the thickness $L_{core}$ of substrate 21.

Figure 7B:
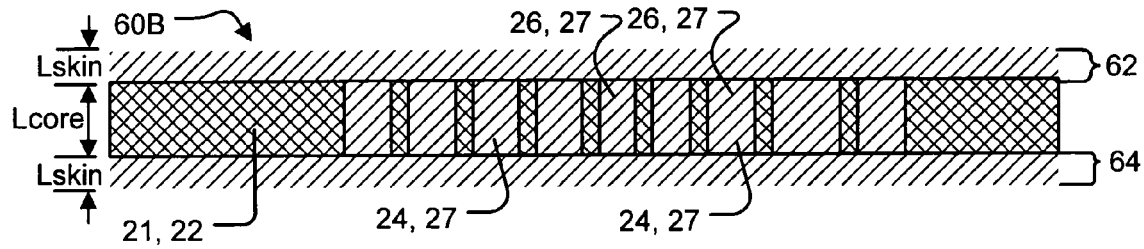

FIG. 7B shows a membrane 60B according to another embodiment of the invention. Membrane 60B has openings 24 filled with ion-conducting material 26 to form ion-conducting passageways 27. Membrane 60B also comprises ion-conducting skins 62, 64 which coat substrate material 22 on either side thereof. The ion-conducting material in each of skins 62, 64 may the same or different and may be the same as or different than the ion-conducting material 26 in openings 24. The ion-conducting material in each of skins 62, 64 is relatively more ion conductive than substrate material 22. In the FIG. 7B embodiment, the thickness $L_{skin}$ of each skin 62, 64 is substantially similar. In other embodiments, the thicknesses of skins 62, 64 differ from one another.

Coating substrate 21 with skins 62, 64 is optional. The provision of skins 62, 64 may be advantageous in that skins 62, 64 can provide ion-conducting passageways between non-porous regions and porous regions of substrate 21 (i.e. between ion-conducting and non-ion-conducting regions of membrane 60B) and between non-porous regions on opposing sides of substrate 21 (i.e. between non-ion-conducting regions on either side of membrane 60B).

Figure 7C:
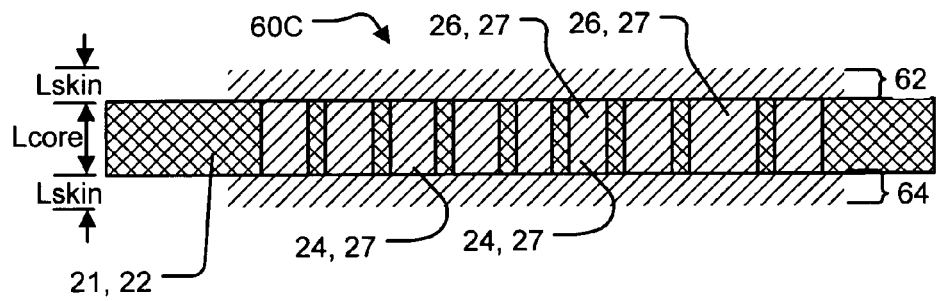

FIG. 7C shows a membrane 60C comprising a substrate 21 having openings 24 filled with ion-conducting material 26 to form ion-conducting passageways 27. Substrate 21 is coated with ion-conducting skins 62, 64. In the FIG. 7C embodiment, skins 62, 64 extend transversely over the porous region of substrate 21 and slightly into the non-porous region of substrate 21. In other embodiments, skins 62, 64 extend transversely over only a part of the porous region of substrate 21. In still other embodiments, skins 62, 62 extend transversely over only the porous region of substrate 21 and do not extend transversely into the non-porous region of substrate 21.

Figure 7D:
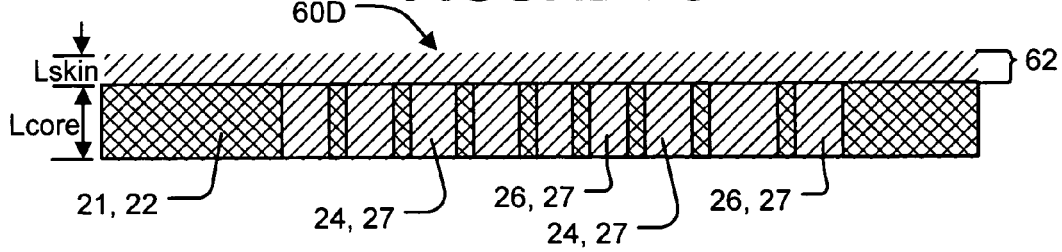

FIG. 7D shows a membrane 60D comprising a substrate material 22 having openings 24 filled with ion-conducting material 26 to form ion-conducting passageways 27 and a single ion-conducting skin 62 which coats only one side of substrate 21. Skin 62 may have different transverse extension characteristics as described above.

Figure 8A:
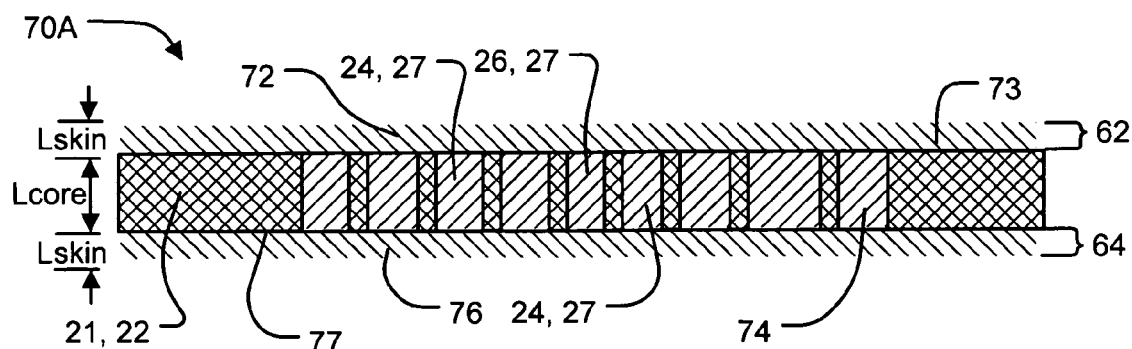
FIGS. 8A–8B are cross-sectional schematic views of ion-conducting membranes in which multiple different ion-conducting materials are applied in layers to form a composite membrane structure.

FIG. 8A shows an ion-conducting membrane 70A according to another embodiment of the invention. Membrane 70A comprises a substrate 21 made of substrate material 22 with openings 24 formed at selected locations as described above. Substrate 21 supports a plurality of ion-conducting materials of different compositions. In the FIG. 8A embodiment, membrane 70A comprises three layers of ion-conducting material including: a skin layer 62 of a first ion-conducting material 72 on a first side 73 of membrane 70A; a mid layer of a second ion-conducting material 26 different from first material 72; and a skin layer 64 of a third ion-conducting material 76 different from second material 26 (and optionally different from both first material 72 and second material 26) on a second side 77 of membrane 70A. Ion-conducting materials 72, 26, 76 are relatively more ion conductive than substrate material 22. In the FIG. 8A embodiment, skins 62, 64 both have approximately equal thickness ($L_{skin}$), but this is not necessary.

Figure 8B:
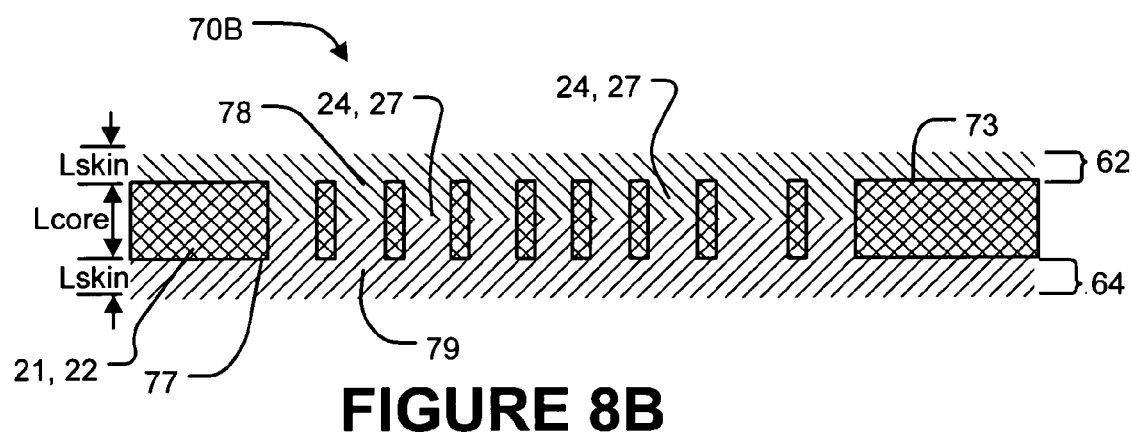

FIG. 8B shows an ion-conducting membrane 70B according to another embodiment of the invention. Membrane 70B has two ion-conducting layers 78, 79 of different ion-conducting materials. The ion-conducting material of layers 78, 79 is relatively more ion-conductive than substrate material 22.

Ion-conducting material(s) may be deposited onto and into a substrate to make an ion-conducting membrane according to the invention in any of a variety of methods including casting, dipping, printing, syringe injection and molding. Further, when one or more skins are used, it is possible to fabricate a membrane by bonding a substrate having a porous region to a pre-formed sheet of ion-conducting material (i.e. a skin) or between two pre-formed sheets of ion-conducting material. A membrane may also be formed by bonding ion-conducting sheets (skins) to a liquid precursor.

Figure 9A:
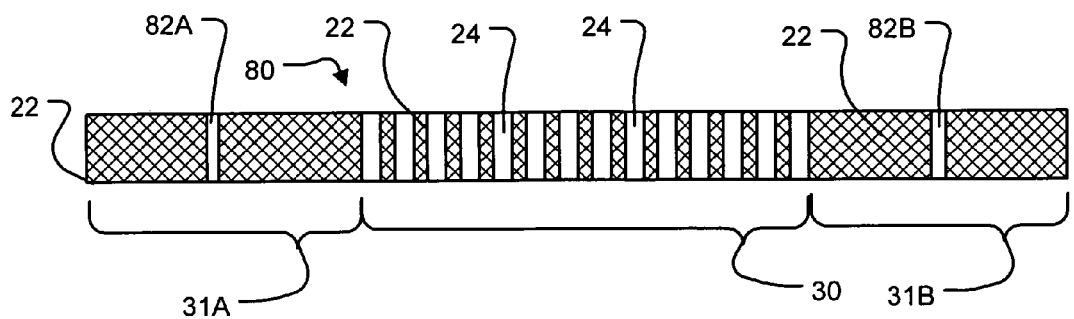
FIGS. 9A and 9B schematically depict the fabrication of an ion-conducting membrane according to a particular embodiment of the invention.
Figure 9B:
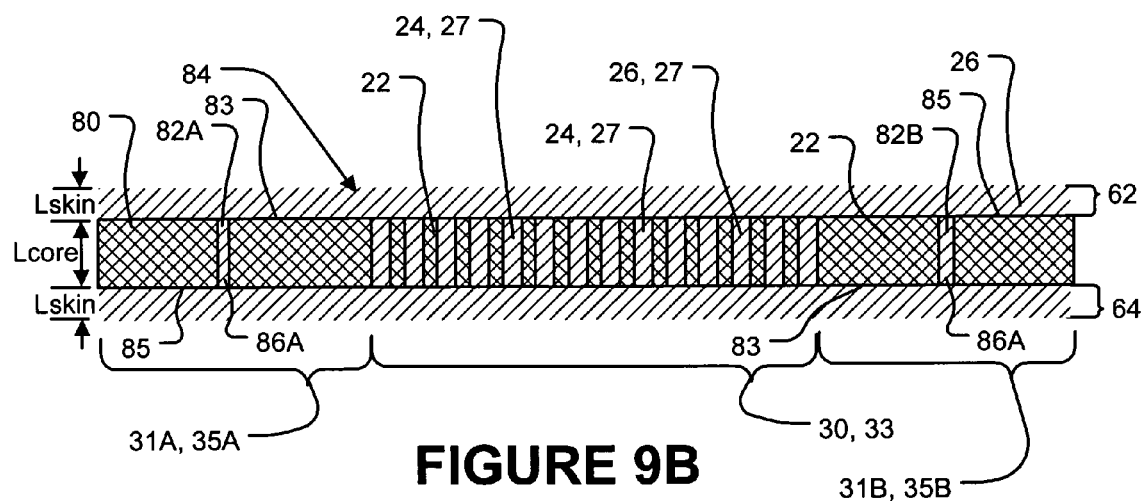

FIGS. 9A and 9B schematically depict the fabrication of an ion-conducting membrane according to a particular embodiment of the invention. FIG. 9A depicts the formation of a substrate 80. Substrate 80 comprises a substrate material 22 in which openings 24 have been formed at selected locations as described above to provide porous region 30 and non-porous regions 31A, 31B on either side thereof.

In the FIG. 9A embodiment, each of non-porous regions 31A, 31B is provided with one or more optional fabrication vias 82A, 82B. Fabrication vias 82A, 82B may be formed in the same manner as openings 24. Fabrication vias 82A, 82B are preferably spaced apart from porous region 30. In some embodiments, fabrication vias 82 are formed at locations that are transversely spaced apart from corresponding porous region(s) 30 by a distance of at least 1½ L, where L is the center to center transverse spacing between nearest adjacent openings 24 in corresponding porous region(s) 30. In other embodiments, fabrication vias 82 are formed a locations that are transversely spaced apart from corresponding porous region(s) 30 by a distance of at least 3 L.

FIG. 9B depicts the addition of ion-conducting material 26 to substrate 80 to form ion-conducting membrane 84 having ion-conducting passageways 27. Ion-conducting material 26 is relatively more ion-conductive than substrate material 22. In the FIG. 9B embodiment, ion-conducting material 26 is applied in such a manner (e.g. by casting) that ion-conducting material 26 coats substrate 80, filling openings 24, filling optional fabrication vias 82A, 82B (as indicated at 86A, 86B) and forming ion-conducting skins 62, 64. Optional fabrication vias 82A, 82B may provide an advantage in that when ion-conducting material 26 is applied it may be in a liquid form. Ion-conducting material 86A, 86B in fabrication vias 82A, 82B may act like anchors which provide ion-conducting material 26 with tensile strength, thereby tending to prevent deformation of ion-conducting material 26 during drying. In particular, fabrication vias 82A, 82B may improve the uniformity of skins 62, 64. Bonds between skins 62, 64 and substrate 80 (for example, at locations 83, 85) may also add tensile strength to ion-conducting material 26 and thereby reduce deformation of ion-conducting material 26 when drying.

Figure 9C:
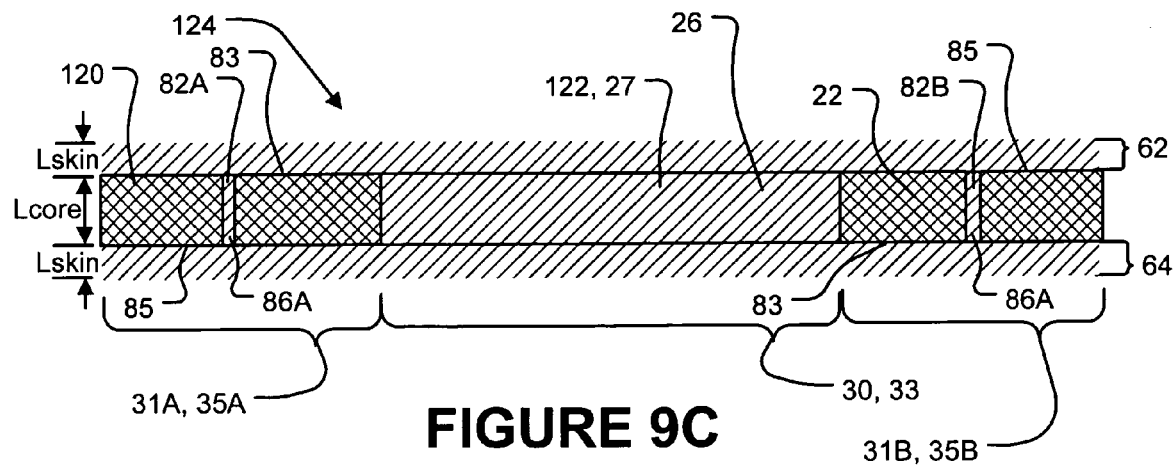
FIGS. 9C and 9D schematically depict different cross-sectional views of an ion-conducting membrane fabricated according to another embodiment of the invention.
Figure 9D:
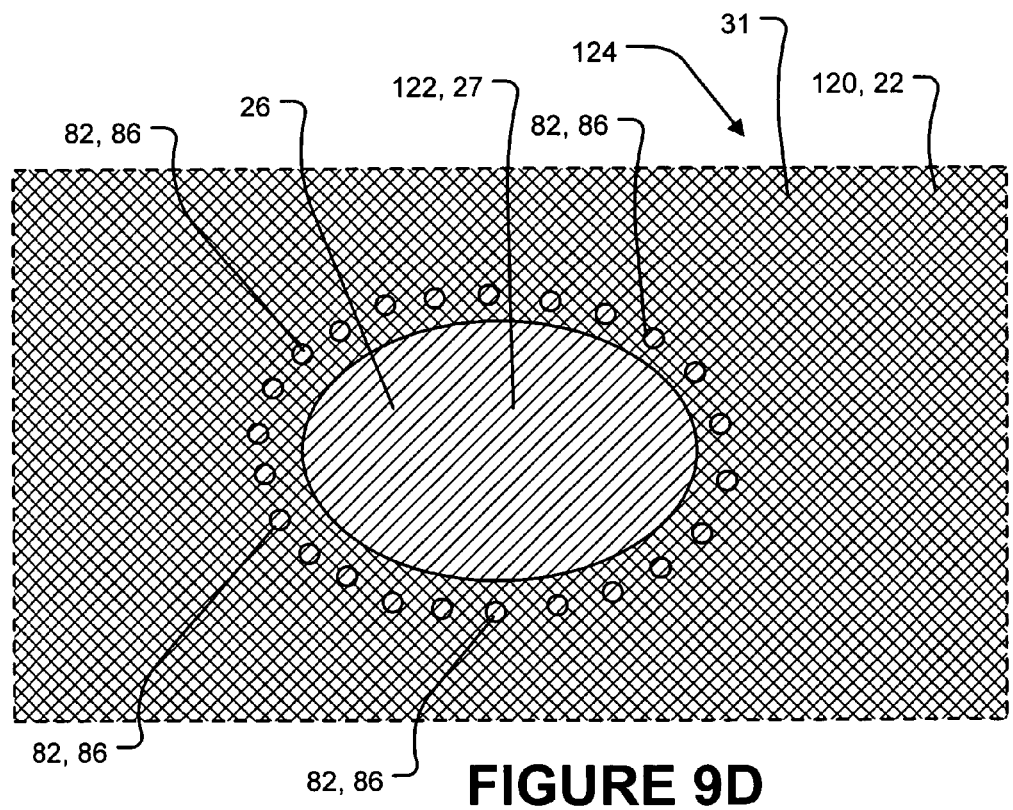

FIGS. 9C and 9D schematically depict different cross-sectional views of an ion-conducting membrane fabricated according to another embodiment of the invention. Substrate 120 comprises a substrate material 22 in which an opening 122 has been formed. Opening 122 preferably comprises a smoothly curved perimeter as shown FIG. 9D to avoid stress concentrations. Non-porous region(s) 31 adjacent opening 122 may be provided with one or more optional fabrication vias 82A, 82B (collectively, 82). Fabrication vias 82 may be formed in any suitable manner as described above and are preferably spaced apart from opening 122. In some embodiments, fabrication vias 82 are formed a locations that are transversely spaced apart from corresponding opening 122 by a distance of at least 100 microns. In other embodiments, fabrication vias 82 are formed at locations that are transversely spaced apart from opening 122 by a distance of at least 200 microns.

Ion-conducting material 26 is added to substrate 120 to form ion-conducting membrane 124 having an ion-conducting passageway 27. Ion-conducting material 26 is relatively more ion-conductive than substrate material 22. In the FIG. 9C embodiment, ion-conducting material 26 is applied in such a manner (e.g. by casting) that ion-conducting material 26 coats substrate 120, filling opening 122, filling optional fabrication vias 82 (as indicated at 86A, 86B (collectively, 86)) and forming ion-conducting skins 62, 64. As discussed above, where fabrication vias 82 are present, they may act like anchors which secure ion-conducting material 26 around the edges of opening 122. Providing such anchors can help to prevent deformation of ion-conducting material 26 during drying and makes the overall structure more rugged. Whether or not fabrication vias 82 are present, bonds between skins 62, 64 and non-porous region(s) 31 of substrate 120 (for example, at locations 83, 85) may permit adhesion of ion-conducting material 26 around the edges of opening 122 that is adequate for some applications.

The membranes described above may be formed by applying an ion-conducting material 26 to a substrate 21 in which openings 24 have been formed. Ion-conducting material 26 fills openings 24 (thereby providing ion-conducting passageways 27) and optionally provides ion-conducting skins 62, 64. In some alternative embodiments, ion-conducting membranes are fabricated by providing a sheet of substrate material and selectively converting the substrate material into a relatively ion-conducting state at selected locations to form ion-conducting passageways or by providing a sheet of ion-conducting substrate material and selectively converting the ion-conducting material to a relatively non-ion-conducting state at selected locations to form ion-conducting passageways.

Figure 10A:
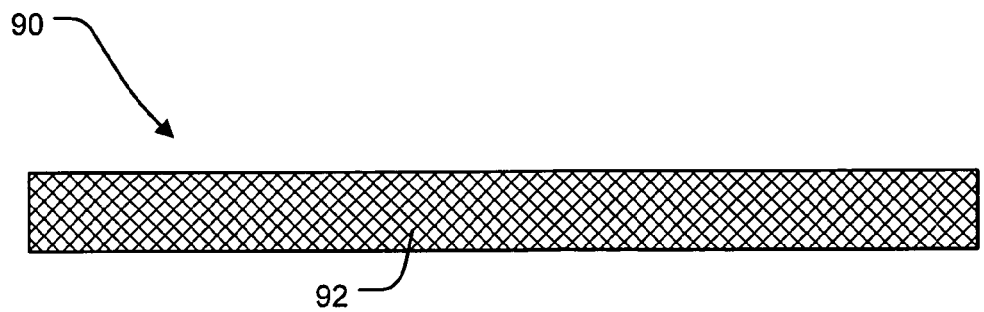
FIGS. 10A–10C schematically depict the fabrication of an ion-conducting membrane according to another embodiment of the invention; and, FIGS. 11 and 11A show fuel cells incorporating membranes as described herein.
Figure 10B:
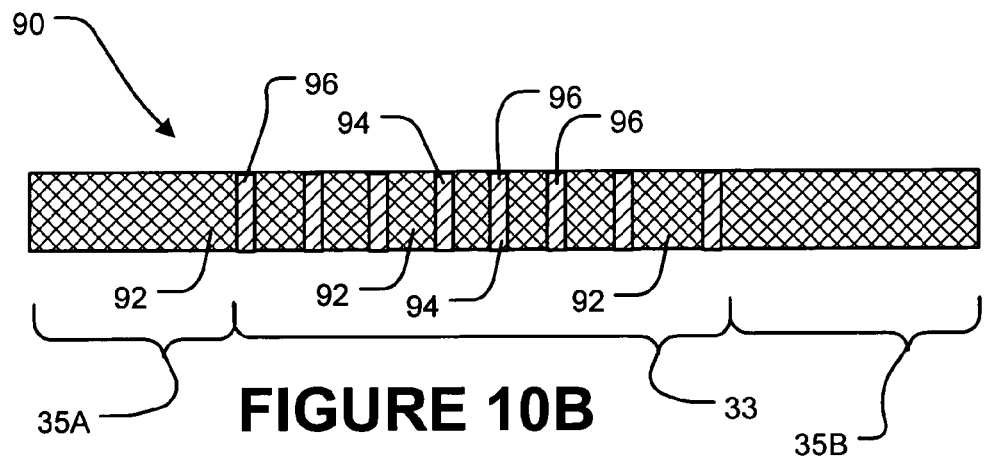
Figure 10C:
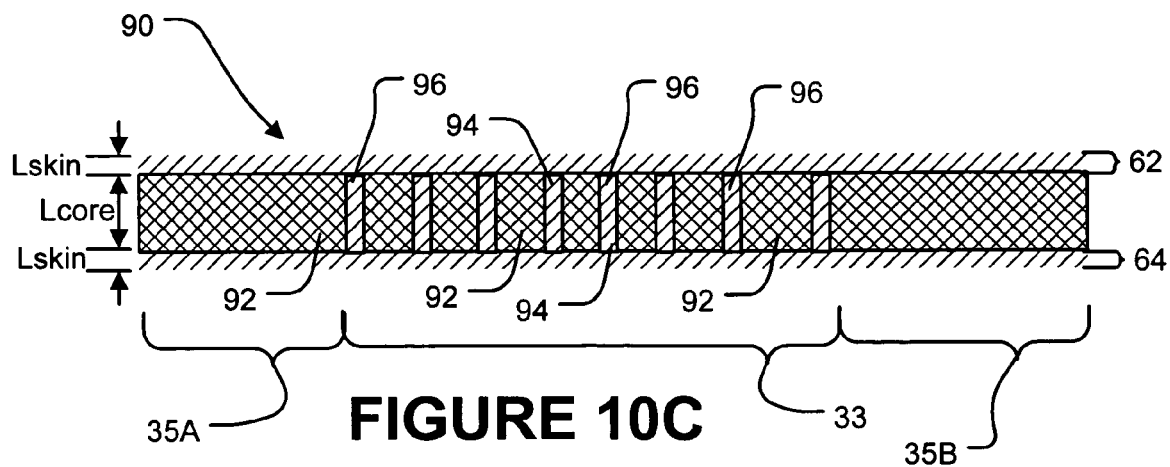

FIGS. 10A–10C schematically depict the fabrication of an ion-conducting membrane according to another embodiment of the invention. FIG. 10A depicts a sheet 90 of a substrate material 92. Substrate material 92 is preferably melt processable. In one particular embodiment, substrate material 92 comprises a resin precursor to Nafion™ which may be a copolymer of tetrafluoroethlyene and perfluoro-3,6-dioxa-4-methyl-7-octenesulfonyl fluoride. Substrate material 92 is convertible in selected locations to a relatively ion-conducting state. For example, the resin precursor to Nafion™ is convertible in selected locations to Nafion™, which conducts ions.

FIG. 10B depicts the conversion of substrate material 92 into a relatively ion-conducting state 94 in selected locations to form ion-conducting passageways 96. Ion-conducting passageways 96 provide ion-conduction paths through substrate sheet 90. Ion-conducting passageways 96 may be arranged in any suitable arrangement for example, ion-conducting passageways 96 may be configured and arranged in any of the ways described above in relation to passageways 27. Sheet 90 may be described as having one or more ion-conducting region(s) 33 (i.e. in a vicinity of ion-conducting passageways 96) and one or more non-ion-conducting regions 35. Each of ion-conducting regions 33 comprises an array of ion-conducting passageways 96. In the FIG. 10B embodiment, non-ion-conducting regions 35A, 35B are located on either side of ion-conducting region 33.

Substrate material 92 may be converted to a relatively ion-conducting state to form ion-conducting passageways 96 using any suitable technique. By way of non-limiting example, ion-conducting passageways 96 may be formed by selectively exposing areas of substrate sheet 90 to chemicals, radiation, heat or the like. Masks may be used to selectively expose areas of substrate sheet 90 to chemicals, radiation, heat or the like. Other lithographic, etching and or printed circuit board fabrication techniques may also be used.

In one particular embodiment, where non-ion-conducting material 92 is a resin precursor to Nafion™, conversion of non-ion-conducting material 92 into an ion-conducting material 94 in the selected locations of ion-conducting passageways 96 may comprise masking sheet 90 and selectively hydrolyzing areas of sheet 90 by exposure to water.

Ion-conducting membranes formed by selective conversion of a substrate material may be tailored to provide different spatial membrane regions with different ion conductivity and/or mechanical characteristics to suit particular applications. For example, ion-conducting passageways 96 formed by selective conversion may be formed to have characteristics (e.g. size, shape, density and/or arrangement) and/or parameters (e.g. L, D, L/D, γ) similar to openings 24 (and/or ion-conducting passageways 27) described above. Ion-conducting passageways 96 may have different characteristics and/or parameters in different regions of sheet 90. Such different characteristics and/or parameters may vary smoothly or may vary discretely. Sheet 90 may be fabricated from a plurality of layers in accordance with the embodiments described above. One or more layers may be added to sheet 90 as described above.

FIG. 10C depicts the application of optional skins 62, 64 of ion-conducting material to sheet 90. Skins 62, 64 may be applied using any of the techniques described above, for example.

Those skilled in the art will appreciate that there are energy losses associated with the conduction of ions through the membranes described above. In some cases, it is desirable to minimize the losses associated with the conduction of ions through a membrane (or a portion of a membrane). Referring to the embodiment of FIG. 7B as an example, the inventors have determined, that for a given core thickness $L_{core}$ and parameter ratio L/D, there is an optimal skin thickness $L_{skin}$ which provides minimum losses across membrane. If the skin thickness $L_{skin}$ is below the optimum level, then the overall membrane losses will be relatively high and will increase with further decreases in skin thickness $L_{skin}$ below the optimum level. Conversely, if the skin thickness $L_{skin}$ is above the optimum level, then the overall membrane losses will be relatively high and will increase with further increases in skin thickness $L_{skin}$ above the optimum level.

In some embodiments of the invention, the optimum skin layer thickness $L_{skin}$ is in a range of 5–50 microns. In some embodiments, the optimum skin layer thickness $L_{skin}$ is in a range of 0.25 to 5 times the thickness of the core layer $L_{core}$.

The ion-conducting membranes disclosed above are capable of providing desired conductivity, gas permeability and mechanical strength characteristics that can be varied at the designer's discretion over the spatial extent of the membrane. This affords a designer great design flexibility and allows the local tuning of mechanical and electrical parameters to best meet the competing needs of ion conductivity and mechanical strength within a fuel cell or similar system.

The invention may be provided in the form of electrochemical cells of any suitable type which incorporate membranes according to the invention. Some embodiments of the invention provide fuel cells or membrane-electrode assemblies for fuel cells.

Figure 11:
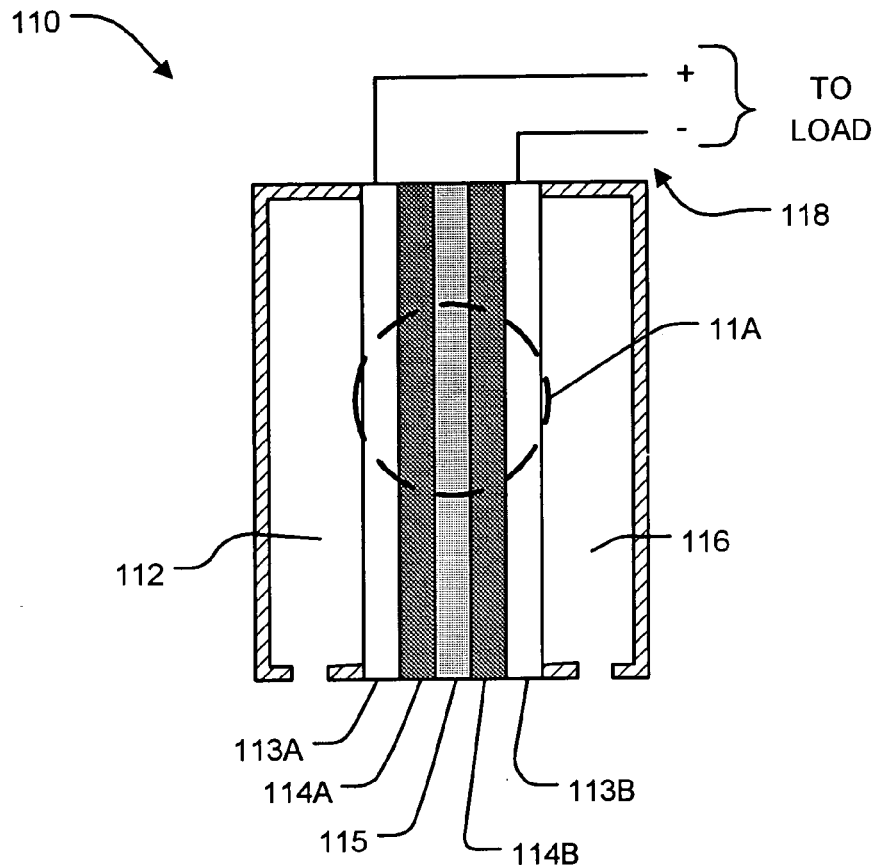
Figure 11A:
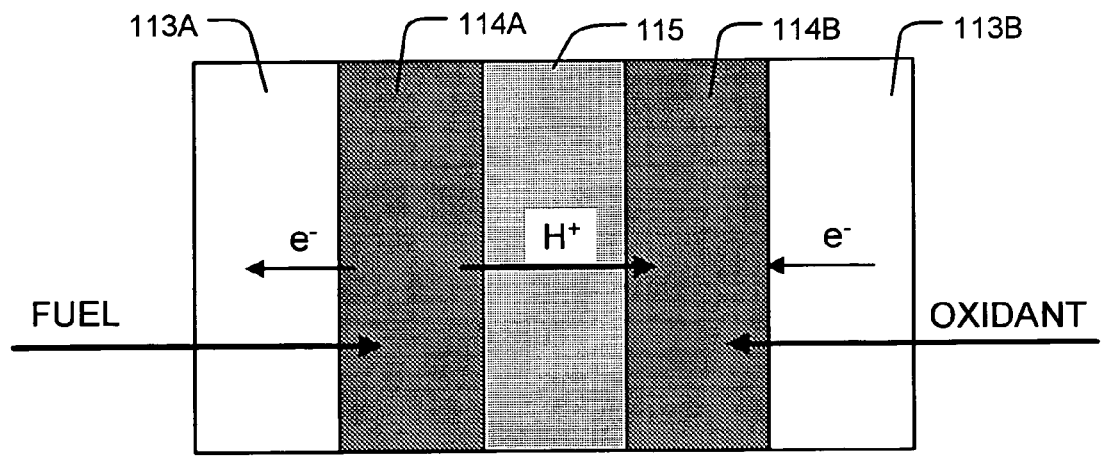

An electrochemical cell 110 of a type described in U.S. application Ser. No. 11/047,560 is shown in FIGS. 11 and 11A. Cell 110 may, for example, comprise a PEM (proton exchange membrane) fuel cell. Cell 110 has a manifold 112 into which is introduced a fuel, such as hydrogen gas. The fuel can pass through a porous current-carrying layer 113A into an anode catalyst layer 114A, where the fuel undergoes a chemical reaction to produce free electrons and positively charged ions (typically protons). The free electrons are collected by current-carrying layer 113A, and the ions pass through an electrically-insulating ion exchange membrane 115. Ion exchange membrane 115 lies between anode catalyst layer 114A and a cathode catalyst layer 114B. Cell 110 has a manifold 116 carrying an oxidant (e.g. air or oxygen). The oxidant can pass through a porous current-carrying layer 113B to access cathode catalyst layer 114B.

As shown in FIG. 11A, electrons travel from the sites of chemical reactions in anode catalyst layer 114A to current-carrying layer 113A. Protons (or other positively charged ions) travel into and through ion exchange membrane 115 in a direction opposite to the direction of electron flow. Electrons collected in current carrying layer 113A travel through an external circuit 118 to the porous current-carrying layer 113B on the cathode side of cell 110. In such cells, electron flow and ion flow occur in generally opposite directions and are both substantially perpendicular to the plane of ion exchange membrane 115.

Catalyst layers 114A and 114B are "dual species conductive" (i.e. they must provide conductive paths for the flow of both electrons and ions). Ion exchange membrane 115 is single species conductive (i.e. it permits ions to flow while providing electrical insulation to avoid internal short-circuiting of cell 110).

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A fuel cell comprising:
    a membrane having first and second major surfaces, at least one ion-conducting region wherein the membrane is ion-conducting and permits ions to pass through the membrane between the first and second major surfaces, and at least one non-ion-conducting region wherein the first and second major surfaces of the membrane are not ion conducting and the membrane is substantially impermeable to ions, the membrane separating a fuel manifold and an oxidant manifold,
    a first electrode in the fuel manifold and a second electrode in the oxidant manifold,
    the membrane comprising a substrate having one or more passageways of ion-conducting material that extend through a portion of the substrate corresponding to the ion-conducting region of the membrane, the one or more passageways having an ion-conductivity that is greater than an ion-conductivity of portions of the substrate that surround the passageways.

2. A fuel cell according to claim 1 wherein the one or more passageways comprises a plurality of ion-conducting passageways.

3. A fuel cell according to claim 2 wherein each of the passageways penetrates the substrate substantially perpendicularly.

4. A fuel cell according to claim 3 wherein each of the passageways has a maximum transverse dimension (D) that is less than or equal to about 2500 microns.

5. A fuel cell according to claim 3 wherein a minimum transverse dimension of each of the passageways is greater than 25 microns.

6. A fuel cell according to claim 3 wherein each passageway has a transverse cross-sectional area less than or equal to about $1 \times 10^{-5}$ m$^2$.

7. A fuel cell according to claim 3 wherein a ratio ($\gamma$) of a total transverse cross-sectional area of the ion-conducting region to a total transverse cross-sectional area of the plurality of passageways is less than or equal to 2.5.

8. A fuel cell according to claim 2 wherein the passageways are arranged in a regular array in the ion-conducting region.

9. A fuel cell according to claim 8 wherein a transverse center to center spacing (L) between nearest-neighbor passageways of the array is less than or equal to about 5000 microns.

10. A fuel cell according to claim 8 wherein a parameter ratio (L/D) of a maximum transverse dimension (D) of each passageway and a transverse center to center spacing (L) between the nearest-neighbor passageways of the array is less than or equal to about 2.5.

11. A fuel cell according to claim 8 wherein the passageways include passageways having transverse cross-sections that are at least one of: substantially circular, substantially hexagonal, substantially rectangular and substantially slit-shaped.

12. A fuel cell according to claim 2 comprising a first skin layer of ion-conducting material disposed on a first face of the substrate, wherein the ion-conducting material of the first skin layer is in contact with an ion-conducting material of at least one of the passageways.

13. A fuel cell according to claim 12 comprising a second skin layer of ion-conducting material disposed on a second face of the substrate, wherein the ion-conducting material of the second skin layer is in contact with the ion-conducting material of at least one of the passageways.

14. A fuel cell according to claim 13 wherein the ion-conducting material in the first skin layer is the same material as the ion-conducting material in the passageways.

15. A fuel cell according to claim 13 wherein the first and second skin layers have thicknesses ($L_{Skin}$) that are substantially the same.

16. A fuel cell according to claim 13 wherein the first and second skin layers have thicknesses ($L_{skin1}$ and $L_{skin2}$) that are each in the range of 5–50 microns.

17. A fuel cell according to claim 13 wherein the substrate has a thickness ($L_{core}$), the first and second skin layers have thicknesses ($L_{skin1}$ and $L_{skin2}$) and wherein a ratio of the thicknesses ($L_{skin1}$ and $L_{skin2}$) of the first and second skin layers to the thickness ($L_{core}$) of the substrate is in a range of 0.25 to 5.

18. A fuel cell according to claim 2 wherein the substrate comprises a laminate comprising a plurality of layers.

19. A fuel cell according to claim 12 wherein the substrate is penetrated by one or more vias, the vias transversely spaced apart from the portion of the substrate and wherein the membrane comprises a contiguous body of ion-conducting material that extends into the vias and also extends into the ion-conducting passageways.

20. A fuel cell according to claim 1 wherein the membrane comprises a plurality of non-contiguous ion-conducting regions, each ion-conducting region comprising one or more corresponding ion-conducting passageways that extend through the substrate.

* * * * *